April 7, 1936.  R. B. LINCOLN ET AL  2,036,224
WELDING APPARATUS
Filed Sept. 29, 1931
Fig. 1.
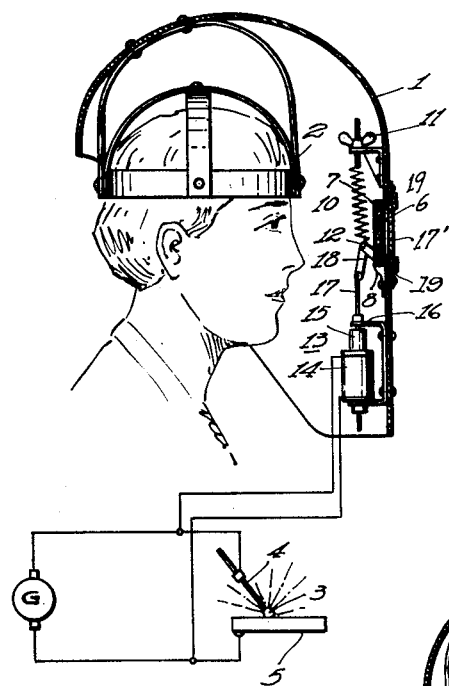
Fig. 2.
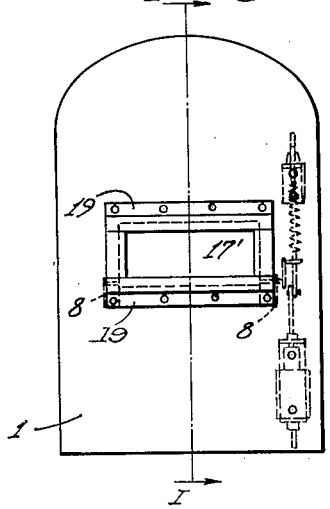
Fig. 3.
Fig. 4. Fig. 5.
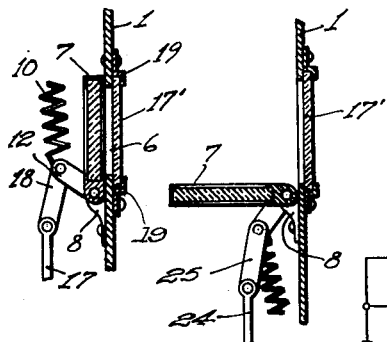
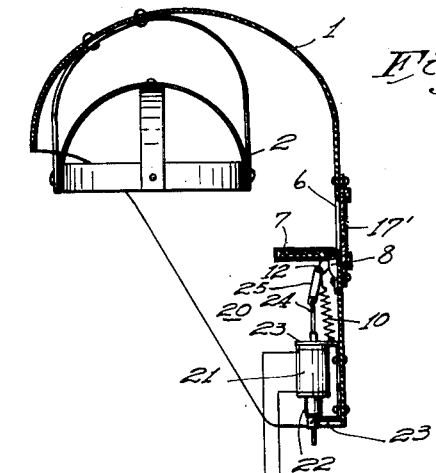
WITNESSES:—
E. C. Luiding
Robert R. Lockwood
INVENTORS
Rollo B. Lincoln &
Albert M. Candy.
BY
W. R. Coley
ATTORNEY Patented Apr. 7, 1936

2,036,224

UNITED STATES PATENT OFFICE 2,036,224

WELDING APPARATUS

Rollo B. Lincoln and Albert M. Candy, Wilkinsburg, Pa., assignors to Westinghouse Electric and Manufacturing Company, a corporation of Pennsylvania Application September 29, 1931, Serial No. 565,726

6 Claims. (Cl. 2—8)

Our invention relates, generally, to protective devices, and, more particularly, to helmets for use in protecting the eyes and face of an operator when using a welding arc.

In the past, helmets for protecting the eyes and face of an operator, when using a welding arc, have been provided with an electrically-operated shutter. In order to operate the shutter, a shunt has been placed in the welding circuit which provided sufficient voltage drop, on flow of welding current, to actuate the shutter to the protective position in front of the eyes of the operator.

It has been found, however, that a shunt, which is capable of causing a sufficient voltage drop over a wide range of welding currents to satisfactorily operate a shutter, is too expensive in construction to warrant its commercial use in a welding circuit. In addition, a shunt further complicates the welding system and makes necessary the provision of special conductors to which it may be connected.

One object of our invention, generally stated, is the provision of a helmet for use with an arc welding system that shall be simple and efficient in operation and readily and economically manufactured.

A more specific object of our invention is to provide for automatically protecting the eyes and face of an operator from injurious rays emitted by a welding arc.

It is also an object of our invention to provide for mechanically closing a shutter in a welding helmet when the voltage between the welding terminals is decreased to a predetermined value.

A further object of our invention is to provide for utilizing a variable characteristic of an arc welding circuit for closing a protective shutter in a welding helmet, when an arc is struck, without using a separate shunt member in the welding circuit.

Other objects of our invention will, in part, be obvious and, in part, appear hereinafter.

Our invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and objects of our invention, reference may be had to the following detailed description, taken in connection with the accompanying drawing, in which:

Figure 1 is a sectional view along the line I—I of Fig. 2, showing details of construction of a welding helmet connected to a welding circuit for operation in accordance with the voltage across a welding arc;

Fig. 2 is a view, in front elevation, of the welding mask shown in Fig. 1;

Fig. 3 is a sectional view, similar to that shown in Fig. 1, showing a second modification of the invention; and Figs. 4 and 5 are enlarged views of the shutter mechanisms of Figs. 1 and 3, respectively.

Referring now to the drawing, the helmet illustrated in Figs. 1 and 2 comprises a face shield 1 which may be constructed of any suitable heat-resisting material that is sufficiently light in weight as to permit its being readily carried by an operator. A head-piece 2 is secured to the shield 1, as shown, for supporting it in a fixed position relative to the head of the operator.

In order to permit the operator to view a welding arc 3, which is maintained between a welding electrode 4 and the work 5 by a suitable generator G, a window 6 is provided in the shield 1. The window 6 may be of any desired shape and size depending on the range of visibility that is required.

It is a well known fact that a welding arc emits rays that are injurious to both the face and the eyes of an operator using the arc to perform a welding operation. While the face may be easily protected by the provision of a shield such as that shown in the accompanying drawing, it is necessary to provide additional means for protecting the eyes of the operator from the injurious rays that pass through the window through which the work to be welded is viewed.

Therefore, a shutter 7 is provided which may be rotatably mounted at its lower edge on brackets 8 by any suitable means. The shutter 7 is preferably composed of a colored glass which will absorb the injurious rays emitted by the welding arc 3 and will transmit only sufficient light to permit the operator to observe the progress of the welding operation.

A spring 10, the tension of which may be adjusted by means of a wing nut 11, is provided and attached to an operating arm 12 which is secured to the shutter 7 to bias it to a position between the eyes of the operator and the arc and over the window 6.

In order to allow the operator to view the work unhindered by the shutter 7, while the welding operation is not being performed, an electromagnet, shown generally at 13, is provided for opening the shutter 7, which comprises a solenoid 14, connected, as illustrated, across the arc 3, and a core-type armature 15, both of which may be mounted in a bracket 16 that is carried by the shield 1. The movement of the armature 15 is transmitted to the shutter 7 by means of a rod 17 which is secured to the armature 15 and attached by means of a link 18 to the operating arm 12.

The proper functioning of the automatic welding helmet shown and described in accordance with the first modification of the invention depends primarily on a change in the voltage that is applied to the solenoid 14 from the welding circuit. In practice, the usual voltage applied to the welding arc 3 is approximately 20 volts while the open-circuit voltage which is applied between the electrode 4 and the work 5, when they are not in electrical contact and the arc is extinguished, is approximately 60 volts.

Therefore, if the terminals of the solenoid 14 are connected directly to the conductors supplying welding current to the electrode 4 and the work 5 and across the arc 3, it will be observed that voltages having approximately a ratio of 3 to 1 will be applied to the solenoid 14 during a complete cycle of a welding operation.

Thus, while the welding operation is being performed, a relatively low voltage is applied to the solenoid 14 with the result that the spring 10 causes the shutter 7 to move to the protective position in front of the window 6.

When the welding operation is completed or when, for any reason, the welding electrode 4 is removed from arcing relation with the work 5, the voltage applied to the solenoid 14 is practically tripled. The increased voltage is sufficient to cause the pull of the solenoid 14 to overcome the pull of the spring 10, thereby opening the shutter 7 and providing the operator with an unobstructed view through the window 6.

The shutter 7 will be maintained in the open position as long as the open-circuit voltage of the welding system is applied to the solenoid 14. In the event that a break should occur in the conductors connecting the solenoid to the welding conductors, the shutter 7 will be automatically closed as is the case when the welding operation is initiated. The operator will then be advised of a fault in the circuit and may then investigate to ascertain its cause.

With a view to providing additional protective means over the window 6 to prevent flying particles from passing therethrough, a second shield 17' is provided and is secured by means of the clips 19 to the outer side of the face-shield 1. While the second shield 17' may be composed of any non-inflammable transparent material, such as clear glass, it is preferable that it be composed of colored glass such as will absorb part of the injurious rays emitted by a welding arc while still permitting the operator to see the work. It will be noted that with the second shield 17', of the character described, in position some protection is afforded to the operator when a welding arc is struck in the event that the shutter 7, for any reason, fails to close.

It will be readily understood that the operation of the electro-magnet 13 may be adjusted by turning the wing-nut 11 or by inserting resistors in the conductors connecting the solenoid 14 to the welding conductors. It is thus possible to use a welding helmet, constructed in accordance with this invention, in connection with welding circuits which are designed to operate over a wide range of voltages.

Referring now to Fig. 3 of the drawing, the welding helmet there shown comprises a shield 1 and a head-piece 2. The shield 1 is provided with a window 6 over which may be positioned a second shield 17' that may be composed of a suitable ray-absorbing material, as set forth in connection with the description for the modification of the welding helmet shown in Figs. 1 and 2.

In order to protect the eyes of the operator while the welding operation is being performed, a shutter 7, of the same type of construction as described hereinbefore, is provided and rotatably mounted at its lower edge on brackets 8. An operating arm 12 is secured to the shutter 7 and a spring 10 is attached thereto for biasing the shutter to the open position.

An electro-magnet, shown generally at 20, comprising a solenoid 21 and a core-type armature 22, which may be mounted on a bracket 23 carried by the shield 1, is provided for actuating the shutter 7 to the protective position. The movement of the armature 22 is transmitted to the operating arm 12 by means of a rod 24 and a link 25.

In many instances, in practice, it is desirable to position the welding generator at a considerable distance from the point where the welding operation is to be carried out. Under this condition, it is necessary to use long conductors 26 and 27 for conducting the welding current from the generator to the point where the welding operation is to be performed. Despite the use of fairly large conductors for this purpose, there is usually an appreciable voltage drop along them while current is being drawn to perform the welding operation.

Therefore, if the solenoid 21 is provided with a low resistance winding whose terminals are connected to either one of the welding conductors at widely separated points, as for example to the opposite ends of conductor 26, a sufficient pull will be exerted on the armature 22 on flow of welding current as to overcome the pull of the spring 10 and to close the shutter 7. As long as the welding current continues to flow and causes a sufficient voltage drop along the particular welding conductor to which it is connected, the shutter 7 will be maintained in the closed position. When the welding current ceases to flow, however, the solenoid 21 will be de-energized and the spring 10 will bias the shutter 7 to the open position.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

We claim as our invention:

1. The combination with a welding circuit, of a protecting helmet disposed to be worn by an operator when using a welding arc, said helmet being provided with a window through which the welding arc may be observed, a light-ray-absorbing shutter mounted on the helmet and disposed to cover the window, resilent means for normally biasing the shutter to cover the window, and electro-magnetic means connected across the welding circuit and opposing the action of the resilient means for permitting the shutter to cover the window when the arc is struck.

2. A helmet for use with a welding circuit in which a welding arc is maintained for performing a welding operation comprising, in combination a shield provided with a window, a shutter mounted on the shield and disposed to close the window, resilient means secured to the shield and to the shutter for biasing the latter to close the window, and electro-magnetic means operatively connected to the shutter and electrically connected across the welding circuit, said electro-magnetic means opposing the action of said resilient means to automatically open the window when the voltage of the welding circuit is high and to permit said resilient means to close it when the voltage of the welding circuit is low.

3. An eye protective device for use with a welding circuit in which a welding arc is maintained for performing a welding operation comprising, in combination, a shield provided with a window through which the arc may be observed, a second shield composed of colored transparent material for absorbing part of the injurious rays emitted by the arc, said shield being secured to the first named shield over the window, a shutter also composed of colored transparent material for absorbing the balance of the injurious rays emitted by the arc and mounted on the shield, means for continually biasing the shutter to a position over the window, and electro-responsive means operative only when the welding circuit is opened for actuating the shutter from its position over the window.

4. An eye-protective device for use with a welding circuit in which a welding arc is maintained for performing a welding operation comprising, in combination, a shield provided with a window through which the operation of the arc may be observed, a second shield composed of colored transparent material and secured to the first-named shield and over the window for absorbing part of the injurious rays emitted by the arc, a shutter, composed of colored transparent material rotatably mounted on the shield and disposed to close the window for removing the balance of the injurious rays emitted by the arc, resilient means for biasing the shutter to a closed position, and electro-magnetic means electrically connected to the welding circuit and mechanically connected to the shutter for actuating it to the open position when the welding current has ceased to flow.

5. The combination, with a welding circuit comprising a generator and a pair of electrodes between which a welding arc is disposed to be maintained, of a shield for protecting the eyes of an operator from the injurious rays emitted by the arc, said shield being provided with a window through which the arc may be observed, a shutter rotatably mounted on the shield and disposed to close the window, a resilient member secured at one end to the shield and connected at the other end to the shutter for biasing it to the closed position, and electro-magnetic means operatively connected to the shutter and electrically connected to the electrodes, said electro-magnetic means being actuated on rise of voltage between said electrodes above a predetermined value for automatically actuating the shutter to the open position.

6. The combination, with a welding circuit comprising a generator and a pair of electrodes between which a welding arc is disposed to be maintained, of a shield for protecting the eyes of an operator from the injurious rays emitted by the arc, said shield being provided with a window through which the arc may be observed, a second shield positioned over the window and composed of colored transparent material for absorbing part of the injurious rays emitted by the arc, a shutter rotatably mounted on the shield and disposed to close the window, said shutter also being composed of colored transparent material for removing the balance of the injurious rays emitted by the arc, a resilient member secured at one end to the shield and connected at the other end to the shutter for biasing it to the closed position, and electro-magnetic means connected to the electrodes and actuated on rise of voltage therebetween above a predetermined value for actuating the shutter to the open position.

ROLLO B. LINCOLN.
ALBERT M. CANDY.